United States Patent [19]

Becker

[11] 4,063,865
[45] Dec. 20, 1977

[54] APPARATUS FOR EXTRUSION OF TUBULAR PARISONS

[75] Inventor: Rudolf Becker, Berlin, Germany

[73] Assignee: Bekum Maschinenfabriken GmbH, Berlin, Germany

[21] Appl. No.: 713,611

[22] Filed: Aug. 11, 1976

[30] Foreign Application Priority Data

Aug. 22, 1975 Germany .............................. 2537419

[51] Int. Cl.² ............................................. B29D 23/04
[52] U.S. Cl. ................................... 425/467; 425/380; 425/532
[58] Field of Search ................ 264/209; 425/197, 198, 425/199, 133.1, 380, 381, 466, 467, DIG. 206; 72/264

[56] References Cited

U.S. PATENT DOCUMENTS

| | | | |
|---|---|---|---|
| 3,488,669 | 1/1970 | Goodrum et al. ................ | 425/381 X |
| 3,520,966 | 7/1970 | Soffiantini ......................... | 425/381 X |
| 3,561,053 | 2/1971 | Pearson ............................ | 425/381 X |
| 3,611,493 | 10/1971 | Fogelberg et al. .................. | 425/466 |
| 3,985,490 | 10/1976 | Kader ............................... | 425/466 X |

*Primary Examiner*—Francis S. Husar
*Assistant Examiner*—Mark Rosenbaum
*Attorney, Agent, or Firm*—Peter K. Kontler

[57] ABSTRACT

An extruder head wherein the housing for a mandrel has a lateral inlet for admission of plasticized material into an arcuate bore of the mandrel and the mandrel has two divergent connecting passages which cause the plasticized material to form a first tubular stream with two radial seams at the inner end of an elongated annular chamber which is defined by the housing and mandrel and wherein the material flows toward an extrusion orifice. The inner end of the chamber contains a ring which divides the first stream into two discrete streams one of which flows along a neck portion of the mandrel and the other of which flows around the ring. The two discrete streams merge into a fourth tubular stream downstream of the ring. The periphery of the ring and/or the neck portion of the mandrel has inclined baffles which subdivide the respective discrete stream into several fields whose boundaries at the downstream end of the ring are out of alinement with the seams of the other discrete stream. This insures that the fourth stream does not have any radial seams which extend all the way from its inner to its outer surface.

13 Claims, 10 Drawing Figures

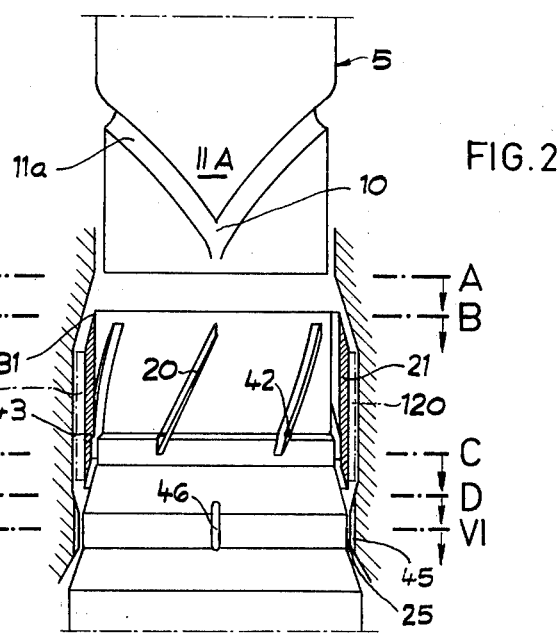
FIG.2
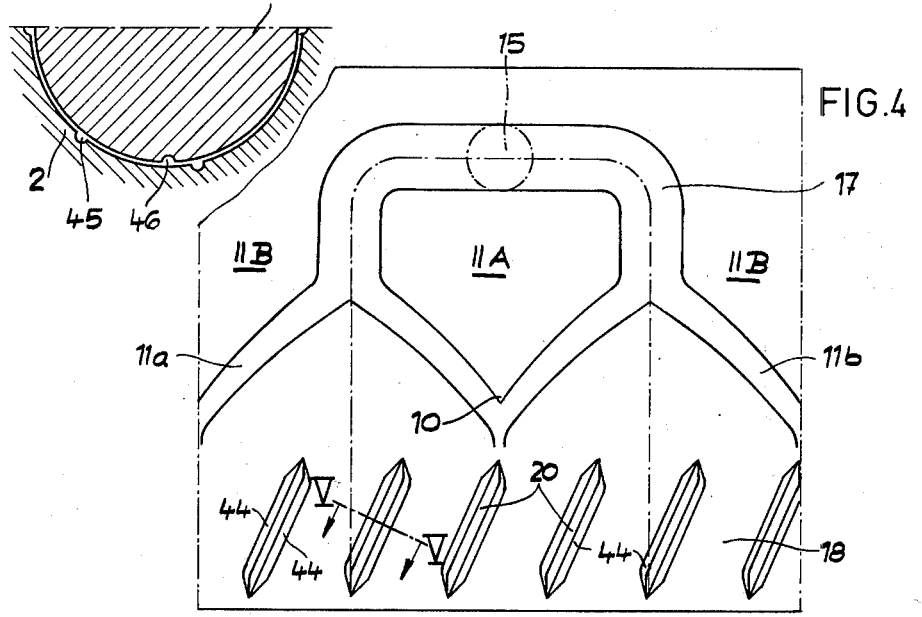
FIG.6
FIG.4
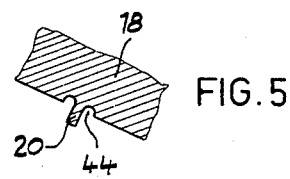
FIG.5

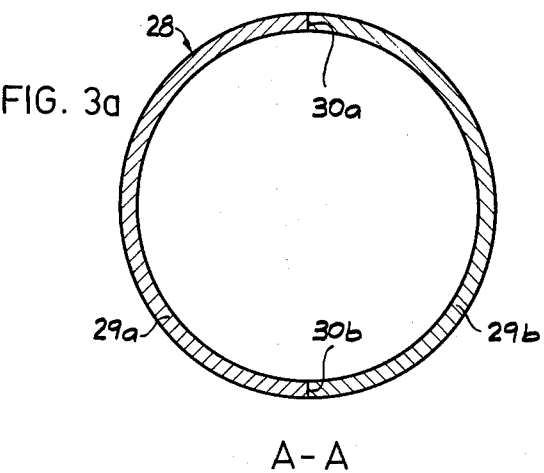
FIG. 3a  A-A
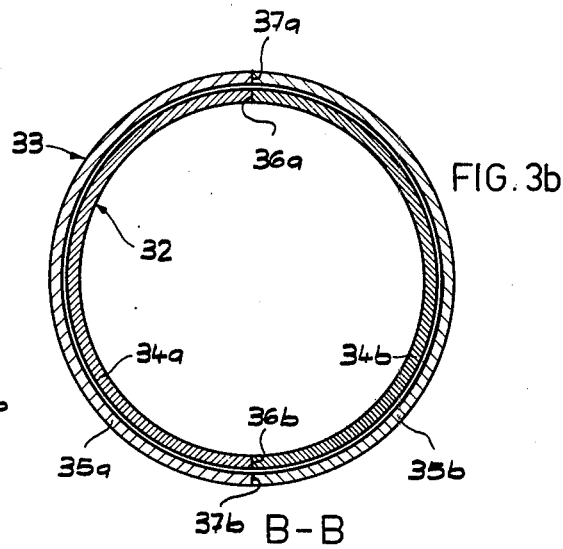
FIG. 3b  B-B
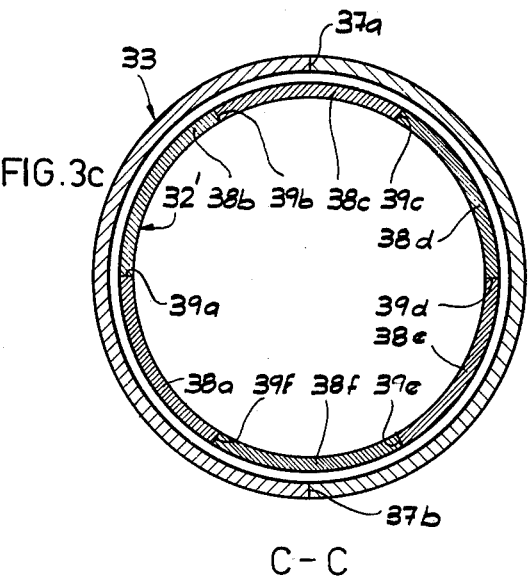
FIG. 3c  C-C
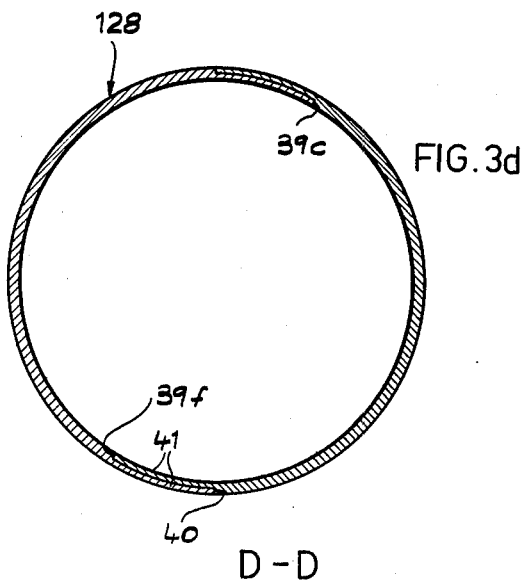
FIG. 3d  D-D

APPARATUS FOR EXTRUSION OF TUBULAR PARISONS

BACKGROUND OF THE INVENTION

The present invention relates to extruders in general, and more particularly to improvements in apparatus for extrusion of tubular parisons. Still more particularly, the invention relates to improvements in extruder heads for the making of tubular parisons which can constitute pipes or analogous hollow articles of constant diameter or which can be introduced into blow molding machines for conversion into bottles or other types of containers.

Italian Pat. No. 877,978 discloses an extruder head wherein a disk-shaped holder for the core in the die comprises an inner ring serving to support the core, an outer ring which is secured to the housing, and an intermediate ring which is disposed between the inner and outer rings and is connected thereto by radially extending webs. The plasticized material which flows toward the holder is divided into two tubular streams one of which flows between the inner and intermediate rings and the other of which flows between the outer and intermediate rings. The aforementioned webs divide each of these streams into several panels or fields. The two streams are supposed to merge downstream of the holder to form a single stream wherein the panels are in intimate contact with each other. The webs in the space between the inner end intermediate rings can be staggered with respect to the webs between the intermediate and outer rings (as considered in the circumferential direction of the core) in order to insure that the seams between the panels of the inner stream are angularly offset with respect to the seams of the outer stream. A drawback of the just described extruder head is that the full pressure which the plasticized material exerts against the core is transmitted to the housing by way of the holder. If the extruder head is designed for extrusion of large-diameter parisons, the aforementioned pressure can reach a value which is much too high for economical production of extruder heads. Moreover, such constructions are impractical in extruder heads wherein the annular chamber for the flow of plasticized material toward the orifice is formed with a storage space and the core must be moved axially of the housing in order to regulate the wall thickness of the parison, i.e., wherein the aforementioned holder must be mounted for movement toward and away from the extrusion orifice.

Another extruder head for subdivision of a first stream of plasticized material into two discrete streams which are thereupon caused to merge into a single stream is disclosed in BASF Schriftenreihe "Kunststoffverarbeitung im Gespraech" (3. Blasformen, 1973, pages 97-98). The mandrel which carries the core for the extrusion die has two heart-shaped cams and includes a sleeve which is located downstream of the cams. The upper end of the sleeve receives plasticized material by way of a channel which is located at the level of the inlet for admission of plasticized material. The material which issues from the plasticizing cylinder is caused to form two discrete streams as soon as it enters the housing of the extruder head, and each such stream flows along an arc of 90 degrees, as considered in the circumferential direction of the mandrel. The two streams are located diametrically opposite each other and one of these streams thereupon flows over and around the sleeve to form a first tubular body. The other stream flows into the sleeve and forms therein a second tubular body which is surrounded by the first tubular body. In other words, the material which is admitted into the housing of the just outlined extruder head forms two discrete tubular bodies without preceding formation of a single tubular stream. This results in a very pronounced resistance to the flow of plasticized material into and through the zones where the formation of two discrete tubular bodies occurs. Moreover, the surfaces along which the plasticized material flows are rather long; this, combined with very pronounced resistance to the flow of material toward the extrusion orifice, adversely influences the orientation of molecules in the plasticized material, i.e., the plasticized mass can develop internal stresses which do not disappear before the material leaves the extruder head. If such material is used for the production of blow molded articles, the internal stresses result in undesirable and unpredictable fluctuations of wall thickness of the ultimate product.

Still another drawback of the just outlined extruder head is that the mandrel must be provided with two heart cams one of which is defined by a portion of the mandrel having a first diameter and the other of which is defined by a mandrel portion having a different second diameter. This prevents the inflow of plasticized material in the form of mirror symmetrical streams. Moreover, a heart cam cannot insure the formation of a tubular stream of plasticized material whose wall thickness is constant all the way around the circumference of the mandrel. Thus, by using two discrete heart cams one of which forms an inner tubular stream and the other of which forms an outer tubular stream, a relatively thick portion of the outer stream is likely to overlie a relatively thick portion of the inner stream which is highly undesirable for obvious reasons.

SUMMARY OF THE INVENTION

An object of the invention is to provide a novel and improved apparatus for extrusion of tubular parisons which prevents localized overheating and/or undesirable orientation of molecules in the plasticized material.

Another object of the invention is to provide a novel and improved mandrel for the extruder head of a blow molding or analogous machine.

A further object of the invention is to provide an extruder head which exhibits the advantages but does not share the drawbacks of conventional extruder heads.

An additional object of the invention is to provide novel and improved means for forming, subdividing and merging tubular streams of plasticized material in an extruder head for the making of tubular parisons.

Another object of the invention is to provide an extruder head wherein all remnants of a first plasticized material can be removed in a simple and convenient manner prior to introduction of a different second plasticized material.

An ancillary object of the invention is to provide an extruder head which can be used as a superior substitute for conventional extruder heads in existing machines for the production of hollow tubular or blow molded articles.

The invention is embodied in an extruder head, particularly for use in machines for the production of hollow tubular or blow molded synthetic plastic articles. The extruder head comprises a housing having a preferably lateral inlet for admission of plasticized synthetic plastic material which can be supplied by a conventional plasticizing cylinder, and a mandrel which is installed in and defines with the housing an elongated annular chamber one end of which receives plasticized material which is admitted into the inlet. The mandrel includes a first portion which has a channel (preferably an arcuate bore) in communication with the inlet and two connecting passages which are defined by two heart-shaped cams of the mandrel and communicate with the channel to provide two paths for the flow of plasticized material into the one end of the chamber. The paths are located substantially diametrically opposite each other with respect to the axis of the mandrel and diverge circumferentially of the mandrel toward the one end of the chamber so that the material which flows from the channel toward the chamber forms a first tubular stream as soon as it leaves the connecting passages and such stream exhibits two radially extending seams located diametrically opposite each other and in line with the tips of the aforementioned cams. The extruder head further comprises a ring or analogous flow dividing means provided in the one end of the chamber and dividing the one end into substantially concentric inner and outer annular compartments which receive the material of the first stream and respectively convey discrete second and third tubular streams of plasticized material toward the other end of the chamber, and a plurality of baffles which are disposed in at least one of the two compartments and are inclined with respect to the axis of the mandrel to subdivide the respective discrete (second and/or third) stream into a plurality of panels or fields which merge into each other and with the other of the two discrete streams downstream of the flow dividing means whereby the seams of the thus obtained fourth stream do not extend all the way from the inner to the outer surface thereof. The extruder head further comprises a die which is provided in the housing and defines with a second portion of the mandrel an annular extrusion orifice in communication with the other end of the chamber.

The novel features which are considered as characteristic of the invention are set forth in particular in the appended claims. The improved extruder head itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged view of a detail of the extruder head, with the mandrel turned through 90° with respect to the position shown in FIG. 1;

FIG. 3a is an enlarged transverse sectional view of a stream of plasticized material in the extruder head as seen in the direction of arrows from the line IIIa—IIIa of FIG. 2;

FIG. 3b is an enlarged transverse sectional view of two streams of plasticized material in the extruder head as seen in the direction of arrows from the line IIIb—IIIb of FIG. 2;

FIG. 3c is an enlarged transverse sectional view of two streams of plasticized material in the extruder head as seen in the direction of arrows from the line IIIc—IIIc of FIG. 2;

FIG. 3d is an enlarged transverse sectional view of a stream of plasticized material in the extruder head as seen in the direction of arrows from the line IIId—IIId of FIG. 2;

FIG. 4 is a developed view of a portion of the mandrel;

FIG. 5 is a fragmentary sectional view of the mandrel as seen in the direction of arrows from the line V—V of FIG. 4;

FIG. 6 is a fragmentary transverse sectional view as seen in the direction of arrows from the line VI—VI of FIG. 2.

DESCRIPTION OF THE PREFERRED EMBODIMENTS

Figure 1:
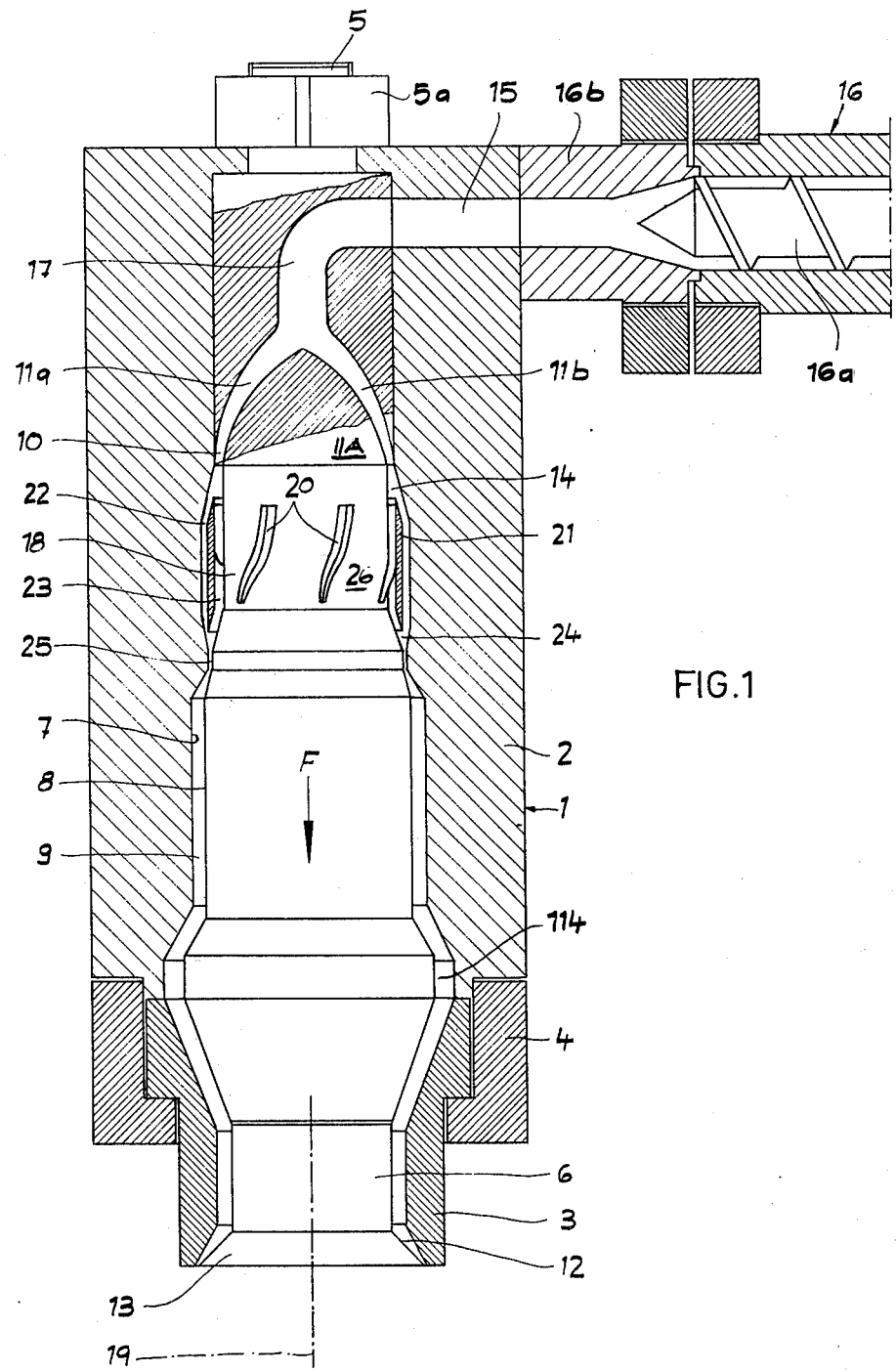
FIG. 1 is an axial sectional view of an extruder head which is constructed and assembled in accordance with a first embodiment of the invention.

FIG. 1 shows an upright extruder head 1 which receives plasticized material from a horizontal barrel 16 containing a rotary feed screw 16a and connected with the housing 2 of the extruder head by an adapter 16b. The housing 2 preferably consists of several sections (not specifically shown) for convenience of manufacture and assembly. The lower portion of the housing 2 is connected with a ring-shaped die 3 by means of a ring-shaped coupling element 4. The die 3 surrounds a core or pin 6 having an outwardly and downwardly flaring lower end portion 13 which defines with the die an orifice 12 for extrusion of a tubular parison, not shown. The core 6 constitutes the first end portion of a mandrel 5 whose upper or rear end portion extends from the housing 2 and is fixedly secured to the housing, as at 5a. The internal surface 7 of the housing 2 defines with the peripheral surface 8 of a median portion of the mandrel 5 an elongated annular chamber 9 wherein plasticized material flows toward, into and through the extrusion orifice 12. The direction of material flow in the housing 2 is indicated by the arrow F. The chamber 9 has a first or inner end 14 at the tips 10 of two heart-shaped cams 11A, 11B of the mandrel 5 and a second end 114 in communication with the upper end of the orifice 12. The upper end 14 of the chamber 9 constitutes a distributor space which receives plasticized synthetic thermoplastic material from the adapter 16b by way of a lateral inlet 15 of the housing 2, an arcuate channel or bore 17 in the upper portion of the mandrel 5, and two downwardly and outwardly flaring connecting passages 11a, 11b defind by the cams 11A, 11B.

In order to form a circumferentially complete tubular stream of plasticized material, the mandrel 5 is formed with the two heart-shaped cams 11A, 11B which define the connecting passages 11a, 11b in the interior of the adjacent portion of the housing and provide two separate mirror symmetrical paths wherein plasticized material flows from the channel 17 into the upper end 14 of the chamber. The lower end of each of these paths extends along an arc of nearly 180°, as considered in the circumferential direction of the mandrel 5. FIG. 2 shows the cam 11A which is located at the front side of the illustrated portion of the mandrel 5; the cam 11B is located at the rear side of such portion. Reference may be had to FIG. 4 wherein the periphery of the mandrel 5 is illustrated in a developed view and which shows that the two tips 10 constitute the boundaries between the lower portions of the connecting passages 11a and 11b.

The so-called neck portion 18 of the mandrel 5, which is located immediately downstream of the connecting passages 11a, 11b, is formed with elongated material deflecting and subdividing projections or baffles 20 which are inclined with respect to the axis 19 of the mandrel and are surrounded by a flow dividing ring 21 which is spaced apart from the adjacent portion of internal surface 7 of the housing 2. The ring 21 can be shrunk onto the baffles 20 so that it is held against axial movement with respect to the mandrel 5. The purpose of the ring 21 is to divide the tubular stream of plasticized material which is formed in the upper end 14 of the chamber 9 into two discrete tubular streams one of which flows around the ring 21 and the other of which flows through the interior of this ring and is divided into several streamlets or fields by the baffles 20. Such streamlets flow through substantially helical channels 26 between the baffles 20. The outer annular compartment for the tubular stream which flows around the flow dividing ring 21 is shown at 22, and the inner annular compartment for the tubular stream which is subdivided by the baffles 20 is shown at 23. The compartment 23 is formed by the aforementioned channels 26. The two tubular streams merge in a ring-shaped zone 24 of the chamber 9 immediately downstream of the annular compartments 22 and 23. The zone 24 is followed by a condensing or flow restricting zone 25 which discharges plasticized material into the next-following main portion of the chamber. The stream which leaves the zone 25 on its way toward the extrusion orifice 12 is substantially homogeneous and forms a circumferentially complete tube whose material issues from the extruder head 1 at the lower end of the orifice 12.

The discrete stream of plasticized material which flows through the outer annular compartment 22 consists of two semicylindrical panels or shells which abut against each other at two locations disposed diametrically opposite each other. On the other hand, the discrete stream which flows through the inner annular compartment 23 consists of six arcuate helical panels or fields because the neck portion 18 of the mandrel 5 is formed with six equally spaced baffles 20. The locations where the shells or panels of the outer discrete stream abut against each other are in line with the tips 10 of the cams 11A and 11B. The inclination and distribution of baffles 20 are such that the regions where the shells or panels of the outer discrete stream abut against each other are not in line with any of the six locations where the fields of panels of the inner discrete stream abut against each other. This is shown in detail in FIGS. 3a, 3b, 3c and 3d.

FIG. 3a shows a first tubular stream 28 of plasticized synthetic thermoplastic material which flows through the upper end 14 of the chamber 9 immediately downstream of the tips 10 of the cams 11A, 11B, i.e., upstream of the flow dividing ring 21. This stream consists of two semicylindrical panels or shells 29a, 29b which form two seams 30a, 30b located diametrically opposite each other, disposed in line with the tips 10 and extending in parallelism with the axis 19 of the mandrel 5.

FIG. 3b shows that the upper end portion 31 of the ring 21 divides the first stream 28 into a discrete outer stream 33 having two semicylindrical panels or shells 35a, 35b which form seams 37a, 37b in line with the seams 30a, 30b of FIG. 3a, and a discrete inner stream 32 which has two semicylindrical panels or shells 34a, 34b forming two seams 36a, 36b which are respectively adjacent to and coplanar with the seams 37a, 37b. The six seams 30a, 30b, 36a, 36b, 37a, 37b are located in a common plane which includes the axis 19 of the mandrel 5.

FIG. 3c shows that, whereas the outer stream 33 remains substantially unchanged during flow of its material through the tubular compartment 22, the baffles 20 in the compartment 23 break up the stream 32 in the inner compartment so that, when it leaves the helical channels 26 between the baffles, the stream 32 is converted into a modified stream 32' consisting of six panels or fields 38a, 38b, 38c, 38d, 38e, 38f which form seams 39a, 39b, 39c, 39d, 39e and 39f. FIG. 3c further shows that none of the seams 39a–39f are in register with the seams 37a, 37b of the outer stream 33.

FIG. 3d illustrates a fourth stream 128 which flows through the zone 24 of the chamber 9 and includes the plasticized material of the streams 32' and 33. This stream flows toward the orifice 12 and does not have any radial seams extending all the way from the inner to the outer surface thereof.

It will be noted that the plasticized material which is advanced by the screw 16a and enters the arcuate channel 17 of the mandrel 5 via inlet 15 of the housing 2 first forms a solid cylindrical mass (channel 17), thereupon a first tubular stream 28 immediately downstream of the connecting passages 11a, 11b, thereupon two discrete streams 32, 33 whereby the outer stream 33 flows practically without obstruction (other than friction) through the compartment 22 and the inner stream 32 is converted into a modified inner stream 32' with six abutting panels or fields 38a–38f, and finally a further tubular stream 128 which flows through the zones 24, 25 of the chamber 9, thereupon through the major portion of this chamber and emreges from the die 3 in the form of a tubular parison. The inclination of baffles 20 with respect to the axis 19 of the mandrel 5 insures that the stream 128 does not exhibit any radial seams which extend all the way between the inner and outer surfaces of this stream; instead (and as shown in FIG. 3d), the two outer seams 40 (corresponding to the seams 37a, 37b of the stream 33) are angularly offset with respect to the nearest inner seams (39c, 39f) and are separated from such inner seams by two overlapping layers 41 of plasticized material. Moreover, the inner seams 39 can form helices, i.e., they need not be parallel to the outer seams 40.

As mentioned above, the flow dividing ring 21 can be shrunk onto the baffles 20 to insure that it does not move axially of the mandrel 5. In addition to or instead of such mode of fixing the ring 21, the latter can be attached to the mandrel 5 by forming the lower portions of baffles 20 with external shoulders on projections or ledges 42 which are engaged by an internal shoulder 43 of the ring 21 (see FIG. 2). The ledges 42 cooperate with the shoulder 43 to maintain the flow dividing ring 21 in an optimum axial position with respect to the neck portion 18.

In order to allow for the use of a one-piece mandrel, the inner diameter of the ring 21 should at least equal (but preferably exceeds) the diameter of that portion of the mandrel 5 which includes the tips 10 of the cams 11A and 11B. Thus, the ring 21 can be slipped onto the mandrel 5 from above, before the mandrel is inserted into the housing 2 from below (prior to attachment of the die 3). If the radially outermost end faces of the baffles 20 are located in a common cylindrical plane whose axis coincides with the axis 19, the inner diameter of the ring 21 equals the diameter of such cylindrical plane.

In its simplest form, the mandrel 5 may be formed with only two inclined baffles 20. This suffices to insure that the seams of the inner stream 32' are not in alinement with the seams of the outer stream 33. However, it is presently preferred to provide the neck portion 18 with more than two baffles 20 in order to enable such baffles to properly center the ring 21 with respect to the mandrel 5. In other words, the number of baffles will be selected with a view to reduce the complexity and cost of the mandrel on the one hand and to insure a satisfactory centering of the flow dividing ring on the other hand. Another factor to be considered in connection with selection of the number of baffles is that each seam (37a, 37b) of the outer stream 33 should be located between and equally spaced from two seams of the inner stream 32'. Note FIG. 3c wherein the seam 37a is located midway between the seams 39b, 39c and the seam 37b is located midway between the seams 39e, 39f. This invariably entails the provision of more than two baffles 20, e.g., four, six (as shown in FIG. 4) or even more.

It is equally within the purview of the invention to provide one or more baffles in the outer compartment 22. Such baffles (two are indicated in FIG. 2 by phantom lines, as at 120) may form part of the ring 21 or of the internal surface of the housing 2 in the region of the neck portion 18. The baffles 120 are also inclined with respect to the axis 19 of the mandrel 5. If the extruder head 1 comprises baffles 120, the number of baffles 20 can be reduced. The baffles 120 insure an even more satisfactory distribution of seams in the outer tubular stream (which flows through the compartment 22) with respect to the seams of the inner tubular stream (which flows through the compartment 23).

Referring to FIGS. 4 and 5, the baffles 20 are flanked by elongated grooves 44 which are machined into the material of the neck portion 18 of the mandrel 5. Each groove 44 can extend along the full length of the respective baffle and each such groove is preferably bounded by a rounded (concave) surface. The grooves 44 enhance the confluence of streamlets which flow through the channels 26 between the baffles 20; such confluence takes place immediately downstream of the lower ends of the baffles, i.e., in the lowermost portion of the annular compartment 23, as viewed in FIGS. 1 or 2. The plasticized material which is displaced by the baffles 20 in the circumferential direction of the neck portion 18 enters the respective grooves 44, and such material flows toward and merges into the interior of the tubular stream 32' which develops immediately downstream of the baffles 20.

An additional advantage of the grooves 44 is that they facilitate the rinsing of compartment 23, e.g., when a first type of thermoplastic material is to be replaced with thermoplastic material of another type, especially if the color of the material to be introduced into the compartment 23 is different from the color of previously used material. In the absence of grooves, remnants of previously used material would tend to accumulate in dead corners between the root portions of the baffles 20 and the periphery of the neck portion 18.

The molecules of streamlets which flow between the baffles 20 of the neck portion 18 are oriented as a result of boundary layer friction. Moreover, the material of such streamlets is heated owing to frictional contact with surfaces bounding the channels 26. The orientation influences the shrinkage characteristics of the material, i.e., the extent to which the material tends to shrink subsequent to flow through the channels 26 is different from the shrinkage of a stream which would flow through the compartment 23 in the absence of baffles. The heating entails a localized reduction of strength of the parison; this can result in the making of blow molded articles with walls having a thickness which is less in the regions where the aforementioned heating of plasticized material took place. Such adverse effects upon the plasticized material can be neutralized by admitting to the tubular stream 128 in the zone 24 and/or 25 of the chamber 9 batches of plasticized material having a different molecular orientation and a temperature corresponding to the temperature of plastic material which would have passed through the compartments 23 in the absence of baffles 20. FIGS. 2 and 6 show that the mandrel 5 is formed with elongated recesses or grooves 46 which are aligned with and located downstream of the tips 10, and that the internal surface 7 of the housing 2 is formed with elongated recesses or grooves 45 in line with the lower ends of the respective baffles 20. The heart cams 11A, 11B also contribute to aforediscussed adverse effects upon the molecular orientation and strength of plastic material in the stream 128.

Figure 7:
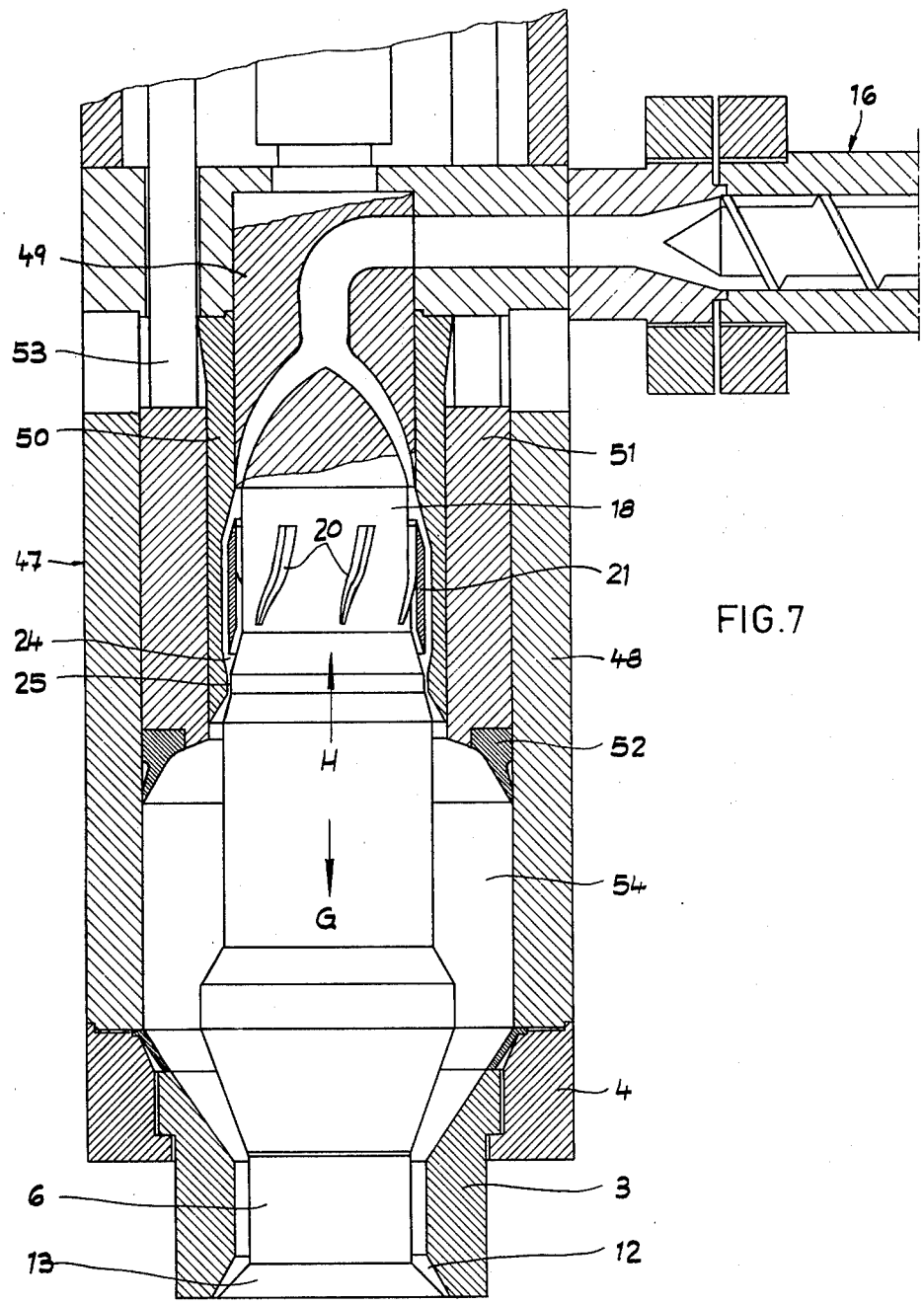
FIG. 7 is an axial sectional view of a modified extruder head.

FIG. 7 shows a modified extruder head 47 wherein all such parts which are identical with or clearly analogous to corresponding parts of the extruder head 1 of FIG. 1 are denoted by similar reference characters.

The elongated annular chamber has an enlarged portion or storage space 54 located immediately upstream of the core or pin 6 and located in front of (below) a reciprocable annular piston 51 surrounding a sleeve 50 which is rigid with the upper portion of the mandrel 49. The piston 51 is slidable in the axial bore of the housing 48 and is connected with piston rods 43 which can move it forwardly (see the arrow G). The piston 51 (which is provided with a ring-shaped sealing element 52) moves rearwardly (arrow H) in response to flow of plasticised material into the storage space 54. When the piston rods 53 (which receive motion from suitable hydraulic or pneumatic motor means, not shown) move the piston 51 forwardly, the latter expels plasticized material from the storage space 54 into and through the extrusion orifice 12 between the die 3 and the core 6. The material which flows into the upper end of the storage space 54 is treated in the same way as the material which flows toward the orifice 12 of the extruder head 1, i.e., the ring 21 divides a first tubular stream of plasticized material into two discrete tubular streams which merge in the zone 24 of the chamber and flow toward and through the flow restricting zone 25 prior to entering the upstream end of the storage space 54.

If desired, the upward movement of piston 51 in response to admission of plasticized material into the storage space 54 can be assisted by the motor means which serve to move the piston rods 53 downwardly during each extrusion cycle. For example, the motor means for the piston rods 53 may include double-acting hydraulic or pneumatic cylinders.

The improved extruder head exhibits all advantages but does not share the drawbacks of conventional extruder head which employ flow dividing means. Another advantage of the improved extruder head is that its component parts offer relatively little resistance to the flow of plasticized material into the extrusion nozzle. Furthermore, and as shown in FIG. 3d, the seams which develop as a result of the provision of cams 11A, 11B and baffles 20 and/or 120 do not extend all the way from the inner to the outer surface of the tubular stream which is obtained as a result of the merger of discrete streams flowing through the compartments 22, 23. It is preferred to position the blow mold which receives sections of the parison issuing from the orifice 12 (if such parison is to be converted into blow molded articles in the form of bottles or the like) in such a way that the outer seams 40 of the stream 128 shown in FIG. 3d are located in the parting plane of the mold sections. The symmetric arrangement of seams which are shown in FIGS. 3a –3d enhances the quality of tubular or blow molded articles which are obtained from the parison.

The absence of pronounced resistance to the flow of plasticized material in the extruder head 1 or 47 is attributable to the fact that, during conversion of the solid cylindrical stream of plasticized material (in the inlet 15 and channel 17) into a first tubular stream (28), the solid stream is divided into only two panels or shells 29a, 29b each of which extends along an arc of 180°, as considered in the circumferential direction of the mandrel 5 or 49. Moreover, the paths for various streams of plasticized material are relatively short which prevents undesirable orientation of molecules and excessive heating of the material as a result of frictional contact with the surfaces of the mandrel and housing. Such advantages are especially important if the extruder head defines a chamber with a storage space of the general character shown in FIG. 7.

An additional advantage of the improved extruder head is that it is assembled of relatively simple and inexpensive component parts. Thus, the baffles 20 can form integral parts of the neck portion 18 of the mandrel 5 or 49, and the baffles 120 can form integral parts of the flow dividing ring 21. Such baffles can be formed in milling machines which remove material from selected regions of the neck portion 18 provide the channels 26, or which remove material from selected regions of the ring 21 to provide channels between the baffles 120. In fact, the mandrel 5 or 49 and/or the flow dividing ring 20 may constitute inexpensive castings.

The distribution of baffles 20, 120 with respect to each other and with respect to the tips 10 of cams 11A, 11B can be altered in a number of ways without departing from the spirit of the invention.

Since the core 6 is rigid with the mandrel 5 or 49, and the inflow of plasticized material takes place substantially radially of the mandrel whereby the plasticized material flows around the neck portion 18 instead of against the head of a discrete core, the resistance which the core offers to flow of material into the orifice 12 is much less than in extruder heads having cores or pins which do not constitute coaxial extensions of the mandrel. Moreover, the means for supporting the core causes a desirable distribution of plasticized material which leaves the channel 17 into several tubular streams each of which consists of several shells, panel or fields.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In an extruder head, particularly for use in machines for the production of tubular or blow molded synthetic plastic articles, the combination of a housing having an internal surface and an inlet for plasticized synthetic plastic material; a mandrel installed in and defining with said housing an elongated annular chamber one end of which receives plasticized material which is admitted into said inlet, said inlet extending substantially radially of said mandrel and said mandrel including a first portion having a channel in communication with said inlet, a neck portion and two heart-shaped cams defining two connecting passages communicating with said channel and providing two paths for the flow of plasticized material into said one end of said chamber, said paths being located substantially diametrically opposite each other and diverging circumferentially of said mandrel toward said one end of said chamber so that the material which flows from said channel toward said chamber forms a first tubular stream as it leaves said connecting passages; flow dividing means provided in said one end of said chamber, surrounding said neck portion and dividing said one end into substantially concentric inner and outer tubular compartments which receive the material of said first stream and respectively convey discrete second and third tubular streams of plasticized material toward the other end of said chamber, said flow dividing means being spaced apart from said internal surface; a plurality of baffles disposed in said inner compartment within said flow dividing means and inclined with respect to the axis of said mandrel to subdivide the respective discrete stream into a plurality of fields which merge into each other and with the other of said discrete streams downstream of said flow dividing means; and a die provided in said housing and defining with a second portion of said mandrel an annular extrusion orifice in communication with said other end of said chamber.

2. The combination of claim 1, wherein said heart-shaped cams include tips located at said one end of said chamber, said baffles being elongated and at least one end of each of said baffles being offset with respect to said tips, as considered in the circumferential direction of said mandrel.

3. The combination of claim 2, wherein each of said baffles has a first end nearer to and a second end remote from said one end of said chamber, said second ends of said baffles being off-set with respect to the tips of said cams.

4. The combination of claim 3, wherein said second ends of said baffles include a first pair disposed at the opposite sides of and equally spaced from one of said tips and a second pair disposed at the opposite sides of and equally spaced from the other of said tips.

5. The combination of claim 1, wherein said flow dividing means comprises a substantially cylindrical member having an annular shoulder at that side thereof which is adjacent to said one compartment and said baffles comprise projections in abutment with said shoulder.

6. The combination of claim 1, wherein said baffles are provided on said mandrel and said mandrel has rounded surface portions flanking said baffles.

7. The combination of claim 1, wherein said baffles are provided on said mandrel and said mandrel has grooves flanking said baffles.

8. The combination of claim 7, wherein said mandrel has concave surfaces bounding said grooves.

9. The combination of claim 1, wherein said baffles constitute a first set of baffles provided on said mandrel and further comprising a second set of baffles in said outer compartment.

10. The combination of claim 9, wherein the baffles of said second set are provided on said flow dividing means.

11. The combination of claim 1, wherein said housing has internal recesses located downstream of said flow dividing means and in line with the adjacent ends of said baffles.

12. The combination of claim 1, wherein said heart-shaped cams have tips located at said one end of said chamber, said mandrel having grooves located downstream of said flow dividing means and aligned with said tips.

13. The combination of claim 1, wherein said chamber includes an enlarged portion constituting a storage space for plasticized material intermediate said die and said flow dividing means, and further comprising means operatively associated with said storage space for intermittently expelling plasticized material from said storage space by way of said orifice.

* * * * *